United States Patent Office 3,029,775
Patented Apr. 17, 1962

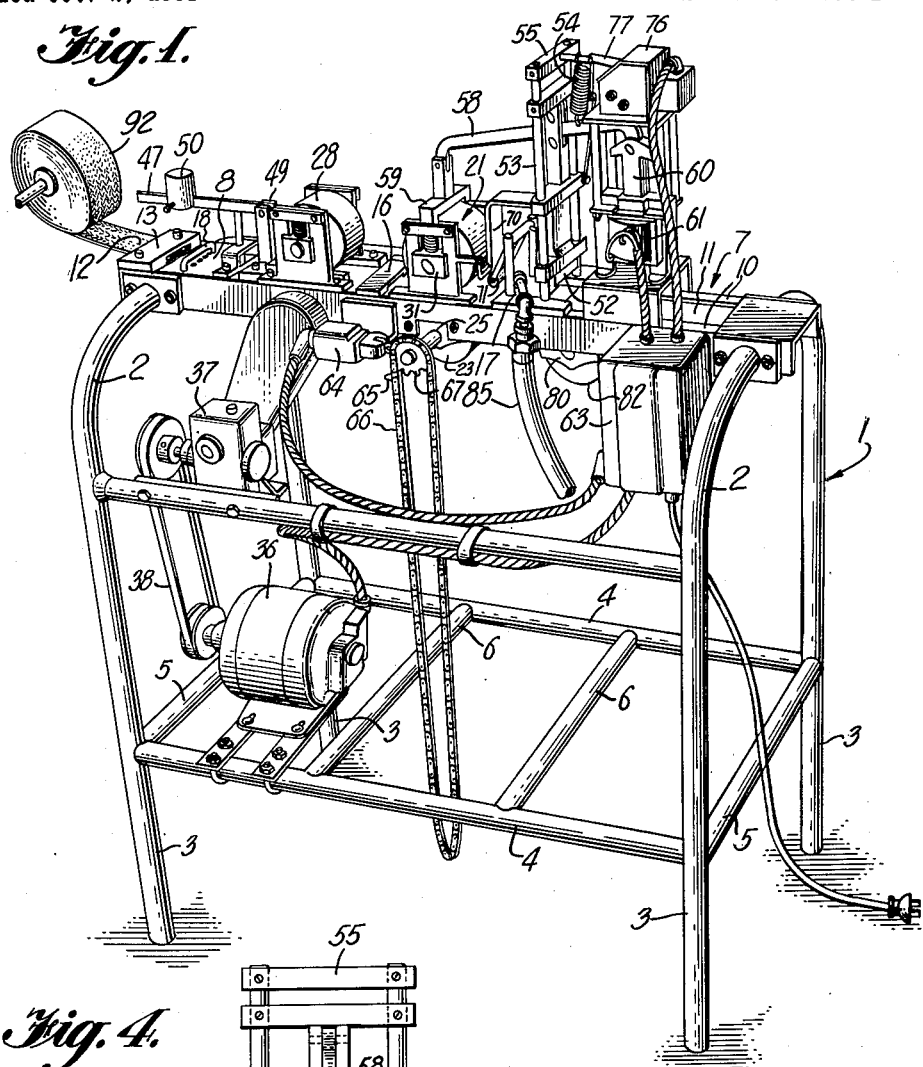

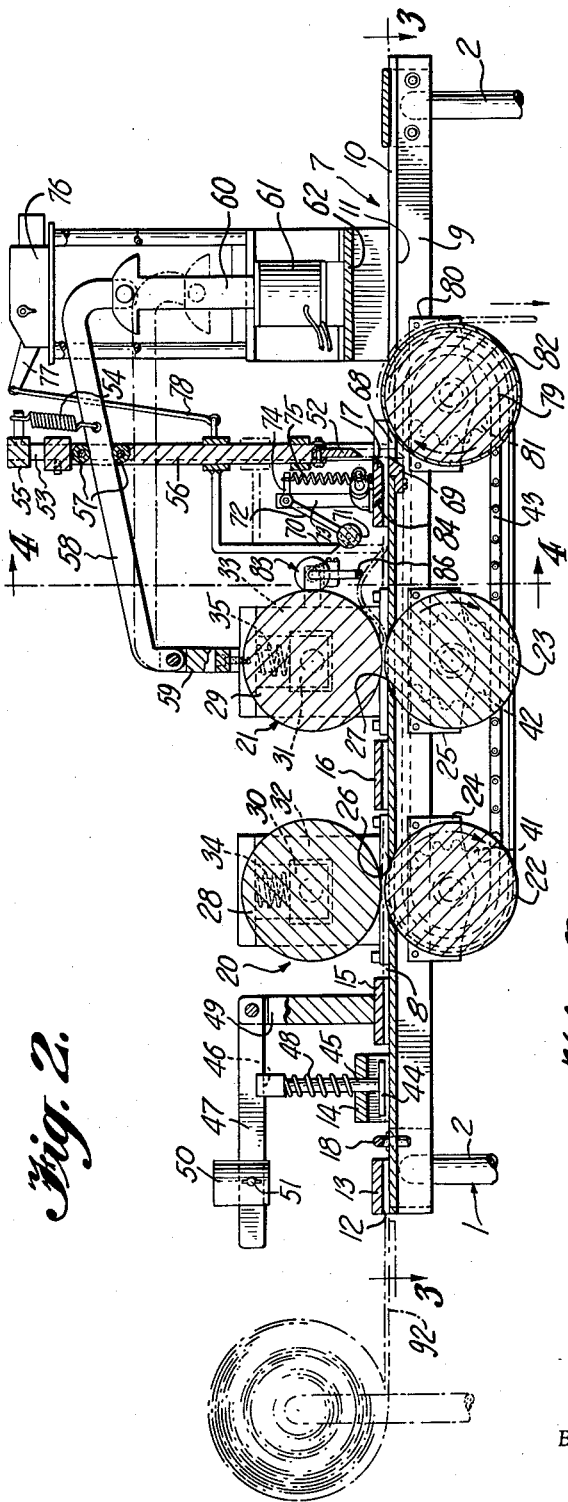

3,029,775
APPARATUS FOR CUTTING STRIP MATERIAL
John K. Nicholson, 2 Thom St., China Grove, N.C.
Filed Oct. 2, 1958, Ser. No. 764,946
4 Claims. (Cl. 118—9)

This invention relates to apparatus for automatically cutting strip material into pieces of predetermined length, and is particularly adapted to cutting narrow width, woven textile material, such as tape.

Many machines used in the textile industry use tape belts as means for transmitting driving power to some of the lighter moving elements. They are used particularly as means for rotating the spindles in spinning, twisting, spooling machines and the like. In some of the machines the tape is wrapped around the spindle pulley, and in others the spindles are movable into and out of engagement with an elongated flight of tape belt. In any event, the tapes are driven rapidly to provide high speed spindle rotation. The tapes do not have a long life, and as the usual mill has many thousand spindles, the need for new tapes is constant.

The cutting and fitting of new tapes is a precision job. The woven tape has some stretch, therefore the tape must be of just the right length and its ends joined and stitched or stapled with just the proper overlap or the tension of the tape will be too great or too little. In either event, the operation of the spindles will be faulty.

The general object of the present invention is to provide apparatus which will automatically cut tapes to precise predetermined lengths as a continuous length of tape is fed through the apparatus.

Another object is the provision of such apparatus which will cut tape to provide driving belts of predetermined tension when applied to a drive path of predetermined length, even though the stretch, or tension, of the tape material being cut should vary from one roll to the next.

A further object is to provide apparatus of this nature wherein means are provided to vary the tension applied to the tape being cut and to cut tapes of different size.

Yet another object is to provide a tape cutting machine having means to automatically rethread and feed the cut tape end.

Another object is to provide means for marking the proper overlap for each cut piece to ensure precise fitting belts.

A still further object is to provide apparatus of this nature which utilizes a pattern chain to control the length of tapes cut, which will be capable of a wide differential in cut lengths without using a pattern chain of excessive length.

Another object is to provide such apparatus having means to automatically stop the drive means in the event of jamming or mal-feeding of the tape.

Other objects of the invention will become apparent from the following description of one practical embodiment thereof, when taken in conjunction with the drawings which accompany, and form part of, this specification.

In the drawings:

FIGURE 1 is a perspective view of strip material cutting apparatus constructed in accordance with the principles of the present invention;

FIGURE 2 is a vertical, longitudinal section through the operating mechanism of the apparatus, the supporting structure being broken away;

FIGURE 3 is a horizontal section taken just above the tape feed path, and is taken on the line 3—3 of FIGURE 2;

FIGURE 4 is a vertical, transverse section taken on the line 4—4 of FIGURE 2, showing the cutting knife structure and a stop motion device; and FIGURE 5 is an enlarged detail of the stop motion, and is taken on the line 5—5 of FIGURE 4.

In general, the apparatus includes means to form a tape path along which a length of tape is drawn under desired tension, measured and cut off in desired lengths. The feed, measuring and cutting are all automatic. Means are provided for varying the tension applied to the moving strip, for changing the cycle of knife operation to vary the length of strip cut, and to stop the tape feed in the event of improper movement of the tape along its path.

Referring to the drawings in detail, the apparatus is shown supported upon a frame 1, made up from end members 2 which have their legs 3 connected by longitudinally and transversely extending braces 4 and 5. Additional braces 6 may be used as desired.

A table 7, on which is located a tape feed path 8, bridges the tops of the end members 2. The table is an inverted channel 9 for the greater part of its length, but has the central portion of the channel web cut away adjacent the output end of the apparatus, to leave the angle member side rails 10 and a central slot 11.

The tape path 8 extends centrally along the table from the input end 12 to the slot 11. The path is defined by means of guides 13, 14, 15, 16 and 17, positioned along the table. Each of these guides is an inverted U-shaped member (see guide 17, FIGURE 4) attached to the table top. A removable, staple-like guide 18 may be used between guides 13 and 14 to center the tape if the tape being used is narrower than that for which the other guides are designed. The table will have several openings 19 into which the legs of the guide 18 may be seated.

The tape will be drawn along the path by means of feed roll couples 20 and 21. Lower rolls 22 and 23 of the couples are located beneath the table and mounted in bearing brackets 24 and 25, fixed to the table, and project through openings 26 and 27 cut in the table. The mounting of the lower rolls is such that the surfaces of the rolls are but slightly above the plane of the table top. The upper rolls 28 and 29 are mounted in bearing blocks 30 and 31, slidably vertically in brackets 32 and 33, fixed to the table. Springs 34 and 35, between the bearing blocks 30 and 31 and the cap pieces of the brackets 32 and 33, bias the upper rollers against the lower ones to provide a yielding grip for the tape at the nips of the respective couples. The couple 20 serve as feed and tension rolls, and the couple 21 as measuring rolls.

The lower rolls of the couples will be driven synchronously by means of a motor 36. The motor is mounted in the frame and drives a gear box 37 by means of a belt 38. The gear box is also mounted on the frame and drives roll 22 by means of a chain 39 over a sprocket 40, carried by roll 22. Roll 22 carries a second sprocket 41 and roll 23 carries a sprocket 42. Chain 43 provides the drive from roll 22 to roll 23, being carried by the sprockets 41 and 42.

The tape is initially put under tension, before feeding to the rolls, by means of a tension plate 44 located in the tape guide 14. The plate is connected to a rod 45 which projects upwardly through the top of guide 14 and has its top end enlarged and provided with a groove 46 in which a weight arm 47 seats. A spring 48, around the rod 45 and bearing against the enlarged top end of the rod and the guide 14, biases the rod and tension plate to its upper positoin. The spring is overcome by the weight imposed upon arm 47. The arm is pivoted to the top of a post 49 which is fixed to the guide 15. A weight 50 is slidably mounted on the arm and can be fixed in positions of adjustment along the arm by a set screw 51. By moving the weight along the arm, the tension applied to the tape by the plate 44 may be varied.

The tape is cut into lengths by means of a vertically reciprocable knife 52. The knife is mounted for sliding movement on guide posts 53, fixed to the guide 17, and is normally held in raised position by a spring 54, attached to a cross beam 55 at the top of posts 53 and to the knife operating arm to be described. The knife has a vertical extension 56 which is slotted and carries two vertically spaced rollers 57 within the slot. An operating arm 58 extends between the rollers and has one end pivoted to a bridge 59 spanning the brackets 33 supporting the upper roller of the couple 21. The other end of arm 58 is connected to the armature 60 of a solenoid 61, mounted on a U-shaped bracket 62 spanning the table 7.

The solenoid 61 and motor 36 are adapted to be connected to a suitable source of electric power through a master switch 63. The motor runs continuously when switch 63 is energized, but solenoid 61 is energized by a micro-switch 64, fixed to the side of table 7 and operated by a lug, or lugs, 65 carried by a control chain 66 which is trained over a sprocket 67 carried by roll 23. Each time the switch 64 is actuated, the knife moves downwardly to cut the tape.

Immediately below the knife, the table is slotted, as at 68, and a shear blade 69 is mounted in the slot, against which the knife may cut.

The knife assembly carries a fixed marker 70, spaced from the knife blade a predetermined distance so that when the knife moves downwardly the marker will contact the tape and place a mark upon it. This will definitely indicate the proper overlap when the tape ends are joined. An inking roll 71 is mounted for rotative movement on a bail 72 pivotally connected to a post 73 which also rises from the guide 17. An arm 74, carried by bail 72, has one end of a spring 75 connected to it. The other end of this spring is secured to the guide 17 to bias the inking roll toward the marker. As the marker moves downward, it pushes the inking roll from its path.

The movement of the knife is also used to operate a piece counter 76, mounted on top of the solenoid mounting structure. The control arm 77 of the piece counter is connected by a link 78 to the knife.

Prior to the cutting operation the tape is drawn taut under the knife by means of a take-off roll 79, which also serves to remove the cut strip from the apparatus. The roll is mounted in brackets 80 connected to the table, and is driven by the chain 43, which drives rolls 22 and 23. This chain meshes with sprockets 41 and 42 on the rolls 22 and 23 and also with sprocket 81 on roll 79. The sprockets 41, 42 and 81 are all the same size, and rolls 22, 23 and 79 all have the same basic diameter. The take-off roll 79, however, is covered with a layer of cloth 82 which slightly enlarges the diameter of the roll and adds to its frictional hold on the tape. Thus, the take-off roll will have slightly higher surface speed than the rolls 22 and 23 which will cause the cloth cover to exert a frictional pull on the tape to hold it taut before cutting, and to move the cut strip quickly from the tape path.

It will be obvious that when the knife is down in the slot 68, the forward movement of the cut tape end behind the knife will be arrested even though the feed and measuring rolls will continue to advance the tape. This will cause the tape to buckle between the measuring roll couple 21 and the tape guide 17, as indicated in dotted lines in FIGURES 2 and 5. If the tape buckles too much, it may be impossible to feed it through the guide when the knife lifts and jamming will occur. Two means are provided to prevent this, one being a stop motion indicated generally at 83, and the other an air jet 84 in the guide 17.

The air jet 84 is formed by providing a plurality of openings or a continuous slot in the guide 17, inclined in the direction of travel of the tape and in communication with a supply line 85 which may be coupled to any convenient source of air under pressure. The air emerging from the jet impinges upon the tape and imposes a force in the direction of tape travel, to eject the tape through the guide when the knife lifts to remove the buckle in the tape so that the original straight line push of the measuring rolls will be regained. This may not be necessary with cotton or heavy nylon tapes as there is enough inherent stiffness in the material to straighten itself, but it will be necessary with thin nylon or similar material tapes.

The stop motion 83 consists of a U-shaped feeler finger 86, pivoted on support arms 87 projecting from the roller support brackets 33. The pivot at one side of the finger carries a cam 88 having a flat 89. With the finger hanging vertically, the flat on the cam will be in contact with the actuator 90 of a micro-switch 91. If the tape buckles as described, it will strike the feeler finger 86 and rock it in one direction or the other, causing the cam to rotate and move the actuator 90 and operate the micro-switch and break the circuit to the master switch and so shut down the apparatus.

In operating the device, a roll of tape 92 is mounted on any convenient axle for free rotation, and the end of the tape is threaded through the guides 13, 18, 14 and 15, between the rolls of the feed roll couple 20, through guide 16, between rolls 23 and 29, and through guide 17. The proper sprocket 67 is mounted on the roll 23 and the control chain with its lug or lugs 65 is hung on the sprocket 67. Sprocket 67 will make one revolution for each revolution of the driven measuring roll 23 and, depending upon the number of teeth on the sprocket, will advance the chain a predetermined number of links per revolution. The length of each link is known and lugs may be placed along the chain as desired to correspond to the measured length of tape to be cut. It will be evident that if a large sprocket with a great number of teeth is used, a great length of chain will be advanced each rotation of roll 23. If it is desired that a number of revolutions of roll 23 be made to advance a long length of tape between cutting movements of the knife, a small sprocket may be used to decrease the length of chain advanced each revolution.

Before starting the machine, the weight 50 is adjusted on the arm 47 to apply the correct pressure on plate 44 to place the tape under proper tension as it is fed so that the cut length will be determined with relation to the stretch of the tape.

When the switch 63 is closed, the motor 36 will be energized and the various rolls of the machine will be rotated to advance the tape along its path. When the lug 65 strikes switch 64, the solenoid 61 will be energized to draw down the knife to sever a length of tape. The cut length will immediately be discharged by the action of the take-off roll 79. The end of the advancing tape, however, will be held back, as described, until the knife lifts, whereupon the tape straightens under its own ability, or the jet 84 pushes it forward. At the time that the knife descends to cut, the marker 70 wipes across the inking roll 71 and moves it aside to descend with the knife and place a mark on the tape to indicate the amount of overlap for that particular tape. Each time a cut is made, the piece-counter 76 is actuated to register a piece cut.

It will be obvious that continued operation of the apparatus will result in repetition of the above cycle of operation as long as tape is supplied. When the piece-counter registers the desired accumulation of pieces, the machine may be cut off.

While in the above one practical embodiment of the invention has been disclosed, it will be apparent that the detailed structure shown and described is merely by way of illustration, and the invention may take other forms within the scope of the appended claims.

What is claimed is:

1. Apparatus for cutting predetermined lengths from strip material comprising, a table having guides thereon defining a travel path for strip material thereacross, a pair of feed rolls mounted on the table and having their nip at the strip travel path, a pair of measuring rolls mounted on the table having their nip at the travel path and spaced from the feed rolls in the direction of strip travel, a take-off roll spaced from the measuring rolls in the direction of strip travel, means to drive one feed roll and one measuring roll at the same surface speed and the take-off roll at higher surface speed, strip tensioning means located ahead of the feed rolls relative to the direction of strip travel, and cutting means located between the measuring and take-off rolls, said cutting means comprising a knife, means to move the knife toward and from the strip travel path, a control chain movable with the driven measuring roll, and means actuated by the control chain to initiate movement of the knife.

2. In apparatus for cutting predetermined lengths from strip material as claimed in claim 1, one of the strip guides located between the measuring rolls and the knife and adjacent the knife, said guide having an air jet directed in the direction of strip travel through the guide to cause air to impinge against a cut end of strip in the guide and feed it across the knife position when the knife has cleared the strip path after a cutting movement.

3. Apparatus for cutting predetermined lengths from strip material as claimed in claim 1 wherein means are carried by the cutting means spaced a predetermined distance from the cutting means toward the measuring rolls and operable on each movement of the knife toward the strip travel path to mark the strip material being advanced along the strip travel path.

4. Apparatus for cutting predetermined lengths from strip material as claimed in claim 1 wherein there are means to adjust the effective restraining action of the strip tensioning means.

References Cited in the file of this patent

UNITED STATES PATENTS

| | | |
|---|---|---|
| 1,549,266 | Kendig | Aug. 11, 1925 |
| 1,567,919 | Cumfer | Dec. 29, 1925 |
| 2,234,017 | Bayer | Mar. 4, 1941 |
| 2,408,363 | Bechman | Oct. 1, 1946 |
| 2,736,380 | Dillenburger | Feb. 28, 1956 |
| 2,785,748 | Von Stocser | Mar. 19, 1957 |

FOREIGN PATENTS

| | | |
|---|---|---|
| 744,632 | Great Britain | Feb. 8, 1956 |